US011461696B2

(12) United States Patent
Jain et al.

(10) Patent No.: US 11,461,696 B2
(45) Date of Patent: Oct. 4, 2022

(54) EFFICACY MEASURES FOR UNSUPERVISED LEARNING IN A CYBER SECURITY ENVIRONMENT

(71) Applicant: Aetna Inc., Hartford, CT (US)

(72) Inventors: Salil Kumar Jain, Jackson Heights, NY (US); David Dyer, Centennial, CO (US)

(73) Assignee: Aetna Inc., Hartford, CT (US)

( * ) Notice: Subject to any disclaimer, the term of this patent is extended or adjusted under 35 U.S.C. 154(b) by 862 days.

(21) Appl. No.: 16/364,663

(22) Filed: Mar. 26, 2019

(65) Prior Publication Data
US 2020/0311596 A1    Oct. 1, 2020

(51) Int. Cl.
*G06K 9/36*      (2006.01)
*G06N 20/00*     (2019.01)
(Continued)

(52) U.S. Cl.
CPC ............. *G06N 20/00* (2019.01); *G06F 21/31* (2013.01); *G06K 9/6215* (2013.01); *G06K 9/6223* (2013.01); *G06K 9/6256* (2013.01)

(58) Field of Classification Search
CPC .......... G06N 20/00–20/20; G06N 3/02–3/105; G06T 2207/20081; G06T 2207/20084; G06T 3/4046; G06T 9/002; G06V 10/82; G06V 30/19093; G06V 30/19107; G06F 21/31–21/44; G06K 9/6215; G06K 9/6222; G06K 9/6223; G06K 9/6218–9/6226; G06K 9/6256
See application file for complete search history.

(56) References Cited

U.S. PATENT DOCUMENTS

2014/0279757 A1* 9/2014 Shimanovsky .... G06Q 30/0261
706/12

FOREIGN PATENT DOCUMENTS

EP    3 203 436 A1    8/2017

OTHER PUBLICATIONS

"Client-Server Model," Wikipedia, https://en.wikipedia.org/w/index.php?title=client-server_model&oldid=887945231 (Mar. 15, 2019).
(Continued)

*Primary Examiner* — Brian Werner
(74) *Attorney, Agent, or Firm* — Leydig, Voit & Mayer, Ltd.

(57) ABSTRACT

A method for performing searches of user information comprises: receiving an initial dataset including the user information; calculating distance metrics between pairs of data in the initial dataset; performing unsupervised learning on the initial dataset to obtain a plurality of total number of clusters, each total number of clusters covering the initial dataset; determining efficacy measures for each total number of clusters using a plurality of distance metric thresholds; determining a desired efficacy measure in the efficacy measures, the desired efficacy measure corresponding to a desired distance metric threshold in the plurality of distance metric thresholds; determining a desired total number of clusters in the plurality of total number of clusters, the desired total number of clusters corresponding to the desired distance metric threshold; and performing unsupervised learning on the initial dataset using the desired total number of clusters to obtain a number of data representations of the user information.

20 Claims, 7 Drawing Sheets

(51) Int. Cl.
*G06F 21/31* (2013.01)
*G06K 9/62* (2022.01)

(56) References Cited

OTHER PUBLICATIONS

International Patent Application No. PCT/US2020/018554, International Search Report (dated Apr. 20, 2020).

* cited by examiner

EFFICACY MEASURES FOR UNSUPERVISED LEARNING IN A CYBER SECURITY ENVIRONMENT

BACKGROUND

Levenshtein distance is a standard distance measure between two strings. Levenshtein distance is a string metric that indicates how similar or dissimilar two strings are to each other. Strings can contain alpha-numeric characters or symbols. Levenshtein distance between two strings provides a measure for a minimum number of single-character edits required to change one string into the other. Strings are composed of characters, and examples of characters include letters, numerical digits, punctuation marks, whitespace, tab, carriage return, and so on. In computing environments, strings are compared with each other in various contexts. For example, in authentication, passwords obtained from a user interface are compared with reference passwords to determine if they match. Furthermore, results of the string matching can inform decisions of a computing system, e.g., based on the passwords matching, granting the user access to a protected database.

Results of string matching and string metrics can be used in unsupervised machine learning. Unsupervised learning involves taking unlabeled data and inferring a function or hidden structure that describes the unlabeled data. In contrast to supervised learning, the unlabeled data provides no error or reward signal and no means of evaluating a potential solution or result. Unsupervised learning identifies commonalities in the unlabeled data, and the function or structure inferred from unsupervised learning can be opaque to a system designer. As such, for a given set of unlabeled data, a chosen unsupervised learning algorithm and its initialized parameters can greatly affect the results of learning.

SUMMARY

An embodiment of the disclosure provides a method for performing quick searches of user information in a cyber security environment using efficacy measures for unsupervised learning. The method is performed by a computer device comprising a processor and memory. The method comprises: receiving an initial dataset including the user information; calculating distance metrics between pairs of data in the initial dataset; performing unsupervised learning on the initial dataset to obtain a plurality of total number of clusters, each total number of clusters covering the initial dataset; determining efficacy measures for each total number of clusters using a plurality of distance metric thresholds; determining a desired efficacy measure in the efficacy measures, the desired efficacy measure corresponding to a desired distance metric threshold in the plurality of distance metric thresholds; determining a desired total number of clusters in the plurality of total number of clusters, the desired total number of clusters corresponding to the desired distance metric threshold; performing unsupervised learning on the initial dataset using the desired total number of clusters to obtain a number of data representations of the user information; and storing the data representations.

An embodiment of the disclosure provides a server for performing quick searches of user information in a cyber security environment using efficacy measures for unsupervised learning. The server comprises a processor and a non-transitory computer readable medium with instructions stored thereon such that when the processor executes the instructions, the server is configured to: receive an initial dataset including the user information; calculate distance metrics between pairs of data in the initial dataset; perform unsupervised learning on the initial dataset to obtain a plurality of total number of clusters, each total number of clusters covering the initial dataset; determine efficacy measures for each total number of clusters using a plurality of distance metric thresholds; determine a desired efficacy measure in the efficacy measures, the desired efficacy measure corresponding to a desired distance metric threshold in the plurality of distance metric thresholds; determine a desired total number of clusters in the plurality of total number of clusters, the desired total number of clusters corresponding to the desired distance metric threshold; perform unsupervised learning on the initial dataset using the desired total number of clusters to obtain a number of data representations of the user information; and store the data representations.

An embodiment of the disclosure provides a non-transitory computer readable medium for performing quick searches of user information in a cyber security environment using efficacy measures for unsupervised learning, the non-transitory computer readable medium including instructions stored thereon for performing: receiving, by a server, an initial dataset including the user information; calculating, by the server, distance metrics between pairs of data in the initial dataset; performing, by the server, unsupervised learning on the initial dataset to obtain a plurality of total number of clusters, each total number of clusters covering the initial dataset; determining, by the server, efficacy measures for each total number of clusters using a plurality of distance metric thresholds; determining, by the server, a desired efficacy measure in the efficacy measures, the desired efficacy measure corresponding to a desired distance metric threshold in the plurality of distance metric thresholds; determining, by the server, a desired total number of clusters in the plurality of total number of clusters, the desired total number of clusters corresponding to the desired distance metric threshold; performing, by the server, unsupervised learning on the initial dataset using the desired total number of clusters to obtain a number of data representations of the user information; and storing, by the server, the data representations.

DETAILED DESCRIPTION

Figure 1:
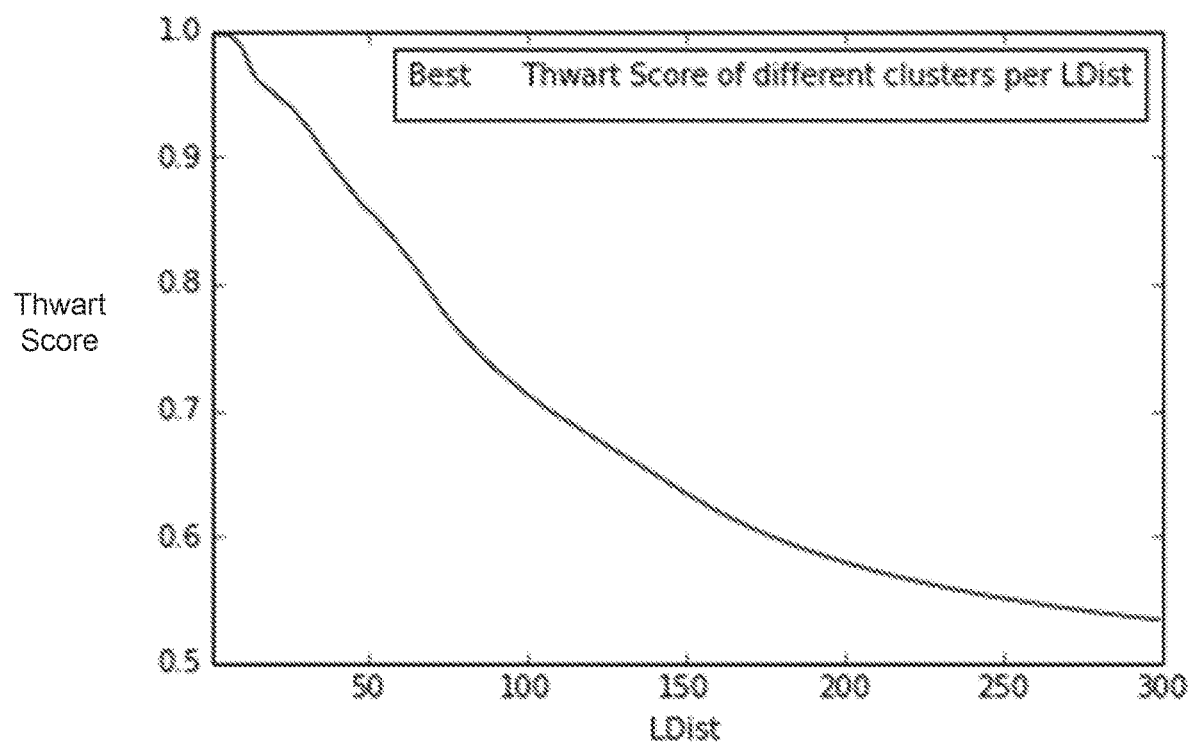
FIG. 1 illustrates a graph of a thwart score vs Levenshtein distance threshold according to an embodiment of the disclosure.

Measuring efficacy of unsupervised machine learning is a difficult task since there are no labeled data. Generally, given a training dataset, unsupervised learning determines a grouping of the training dataset. That is, after performing unsupervised learning, the training dataset is clustered into multiple groups. Since each group does not have an understandable label that indicates its characteristics, it can be difficult to determine why certain data points in the training dataset are assigned to one group and not another. Furthermore, it can be difficult to determine whether using different learning parameters can effect a better set of groupings of the training dataset.

Embodiments of the disclosure provide efficacy measures to assess effectiveness of an unsupervised machine learning algorithm. The efficacy measures are attack rate and thwart rate. In an embodiment, attack rate is a number between 0 and 1, inclusively, and thwart rate is defined as 1−attack rate.

Attack rate can be derived as follows. Assume there are K groups where N data points can be assigned. Each group in the K groups has $M_i$ members where i is a number between 1 and K, inclusively. From this definition, summing up all $M_i$ in all the K groups should yield N. That is, $$N = \sum_{i=1}^{K} M_i.$$

For an attacker to mimic (or attack) any user in the i-th cluster, an attacker has to present any of $M_i$, so probability of attack is $M_i/N$. The average probability for the grouping or clustering in this case is provided as, $$\frac{1}{K} \times \sum_{i=1}^{K} \left(\frac{M_i}{N}\right) = 1/K.$$

Attack rate for the unsupervised clustering is 1/K, i.e., the average probability defined above. In an example, consider that N represents 10,000 users, i.e., 10,000 data points. The users are then grouped together in K groups, thus, the any one user falls within one of K groups. Probability of guessing that a user is in a specific group increases as the number K decreases. Intuitively, more clusters (or groups) K means a more difficult task for an attacker.

As an example, in a cyber security environment, as there are more clusters which a user agent, e.g., a browser user agent, can fall in, the more difficult it is for an attacker to identify the right user agent for the user. Since Attack Rate is 1/K, Thwart rate is 1−1/K. In applications, a high thwart rate is desirable.

Another efficacy measure called Recall is used in machine learning. Recall is a measure of how many positive samples are currently identified out of total positive samples. In unsupervised learning for cyber security, Recall is defined as data for an entity (i.e. user) which is similar using some metric should fall in same group. For example, a user accesses web resources with multiple user agents, and if these user agents are similar to each other using Levenshtein distance (below some threshold), they should fall in a same group. So Recall can be defined as a ratio of how many similar points are for a user (positive) and how many of those fall in a same group (true positive). Thus, Recall=(true positive)/(positive).

A third measure, Thwart Score can be defined as the harmonic mean between Thwart Rate and Recall. A high Thwart Rate and Recall leads to a high Thwart Score. A high Thwart Score is desirable in an unsupervised machine learning system for cybersecurity. Embodiments of the disclosure provide the Thwart Rate, Recall, and Thwart Score as efficacy measures for unsupervised machine learning, since there are no useful measures for unsupervised learning in cybersecurity.

For illustration purposes, examples are used to discuss efficacy measures according to embodiments of the disclosure. FIG. 1 illustrates an example relationship between Thwart Score and Levenshtein distance threshold (LDist). In generating FIG. 1, Levenshtein distance was calculated between browser user agents for a same user, to determine similarity and dissimilarity between the browser user agents. A selected Levenshtein distance threshold was applied to the calculated distances, and distances above the threshold were binned as negative, and distances equal to or below the threshold were binned as positive. K-means unsupervised learning was used to cluster the calculated distances for different values of K. Thwart Score was determined for various Levenshtein distance thresholds. In FIG. 1, the larger the Levenshtein distance threshold, the lower the Thwart Score. Intuitively, the larger the Levenshtein distance, the more likely dissimilar browser user agents are binned together, so Thwart Score should decrease.

Figure 2:
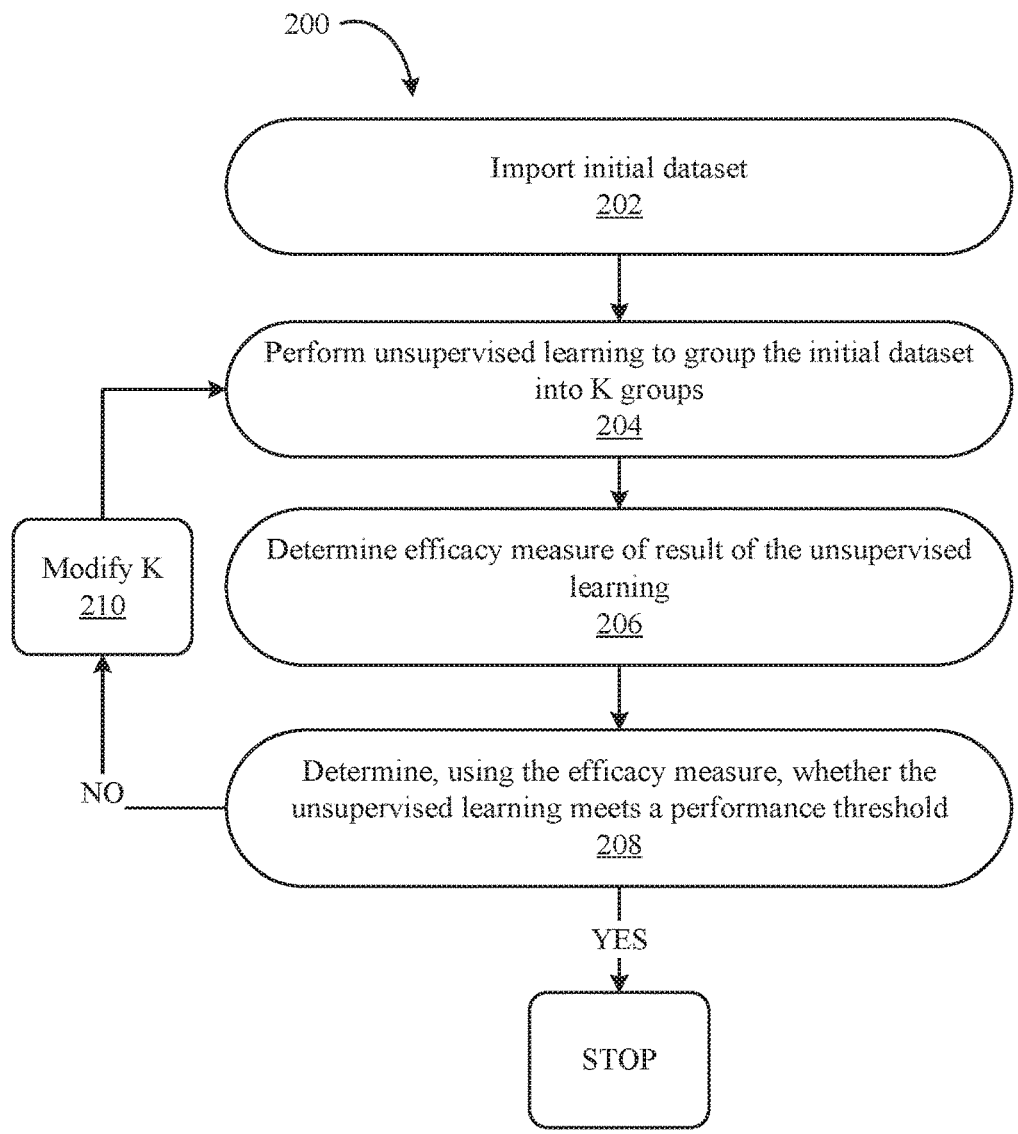
FIG. 2 illustrates a flow diagram for monitoring unsupervised learning using an efficacy measure, according to an embodiment of the disclosure.

FIG. 2 illustrates a process 200 performed by a computing device for monitoring unsupervised learning using an efficacy measure, according to an embodiment of the disclosure. At 202, the computing device imports an initial dataset. In an embodiment, initial dataset is captured from a same mechanism which is eventually used for production. For example, in a web environment, a website for authenticating users can collect user and browser user agent information for some time period. The information is captured for all users that successfully authenticate onto the website. That way, each browser agent collected is associated with a specific user of the website, and the collected browser user agents and each association information form the initial dataset.

At 204, the computing device performs unsupervised learning to group the initial dataset into K groups. The computing device applies an unsupervised learning algorithm, e.g., a clustering algorithm, neural networks self-organizing map, and so on.

In the example where browser agents and association information form the initial dataset, the unsupervised learning algorithm groups the browser agents from multiple users into K clusters. One user's list of browser user agents can span multiple clusters in the K cluster. For example, if the website has 10,000 registered users and 15,000 browser user agents that have been clustered into 5000 groups, a user with 10 browser user agents may have 6 browser user agents in a first group, 3 browser user agents in a second group, and 1 browser user agent in a third group. Thus, the user is associated with 3 groups out of the 5000 groups.

At 206, the computing device determines efficacy measures of the result of the unsupervised learning. Based on the K chosen, the computing device calculates a Thwart Rate. The computing device then determines a Recall. Recall is determined as a ratio of true positives to positives. True positives are determined by calculating string distance, e.g., Levenshtein distance, between pairs within a specific cluster; and pairs with Levenshtein distance below a Levenshtein distance threshold are true positives. Positives are pairs which the unsupervised learning algorithm has identified as being within the specific cluster. The computing device then combines the Thwart Rate and Recall to determine the Thwart Score.

At 208, the computing device determines, using the efficacy measure of 206, whether the unsupervised learning meets a performance threshold. The computing device can compare the Thwart Score to the performance threshold to evaluate the groupings.

If the comparison yields an acceptable performance, then the learning process is completed. On the other hand, if the comparison yields a poor performance, then at 210, the computing device modifies K and then performs unsupervised learning with the new K value at 204.

Figure 3:
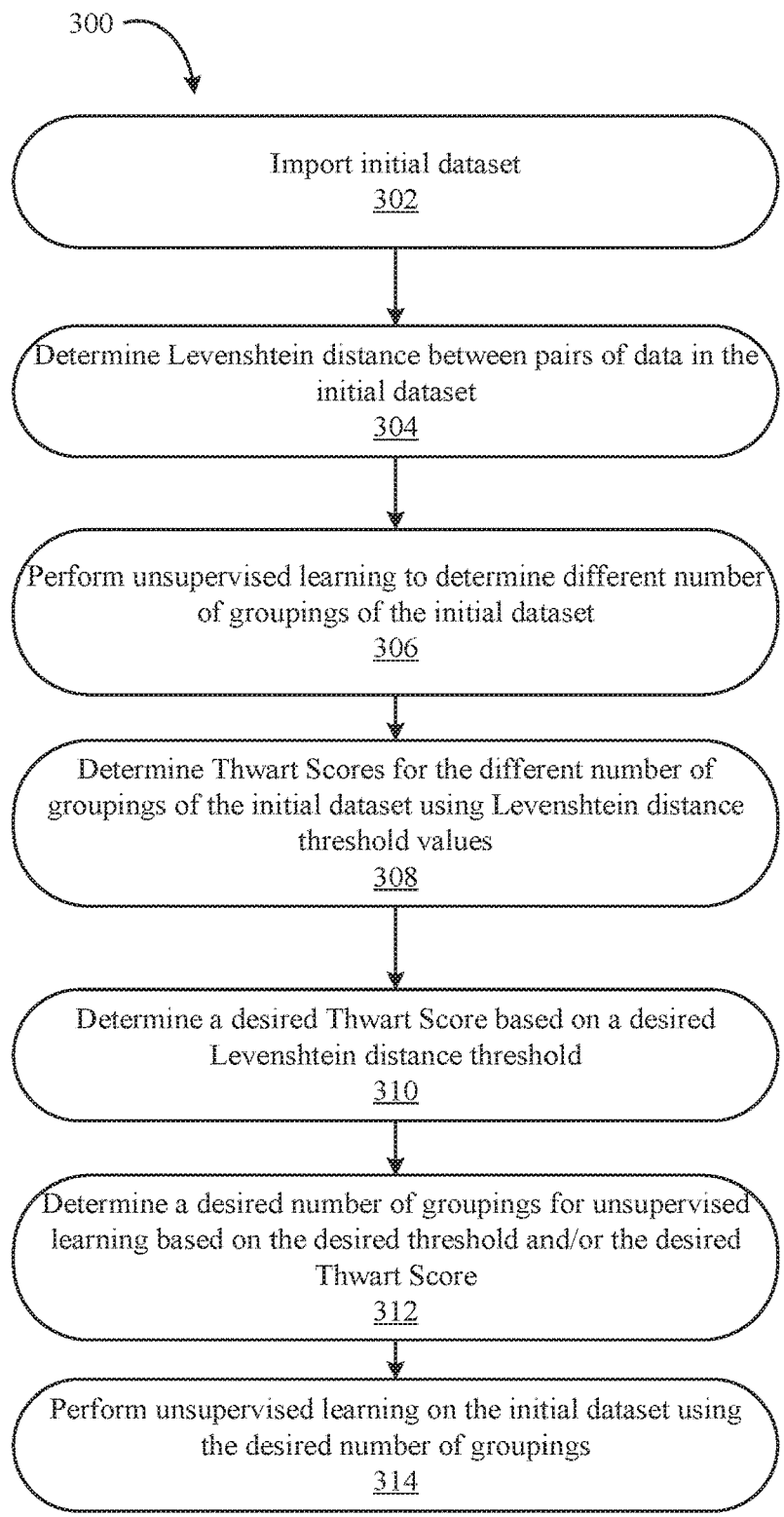
FIG. 3 illustrates a flow diagram for determining parameters for unsupervised learning based on efficacy measures, according to an embodiment of the disclosure.

FIG. 3 is a flow diagram illustrating a process 300 for determining parameters for an unsupervised learning algorithm using efficacy measures, according to an embodiment of the disclosure. At 302, a computing device imports an initial dataset. In an embodiment, the initial dataset is a collection of user agents that users have previously used to engage an authentication system.

At 304, the computing device determines Levenshtein distance between pairs of data in the initial dataset. That is, each data point in the initial dataset is compared with every other data point in a pairwise manner to obtain a set of Levenshtein distances. Levenshtein distance is used as an example, but Manhattan distance or other distance metrics can be applied.

At 306, the computing device determines groupings of the initial dataset based on unsupervised learning. For example, unsupervised learning can be applied to the initial dataset for a predetermined set of groupings. That is, unsupervised learning can be performed on the initial dataset multiple times for different number of groupings.

At 308, the computing device determines Thwart Scores corresponding to different Levenshtein distance thresholds. Thwart rates are determined based on the different number of groupings in 306. Recall is determined based on the Levenshtein distance calculations of 304. Applying various Levenshtein distance thresholds to the Levenshtein distance calculations allows for the determination of true positives. The Thwart rate and Recall are combined to determine the Thwart Score.

At 310, the computing device determines a desired Thwart Score for a desired Levenshtein distance threshold. Given the desired Levenshtein distance threshold, an acceptable Thwart Score is chosen from the Thwart Scores calculated in 308.

At 312, the computing device determines a desired number of groupings for the unsupervised learning algorithm based on the acceptable Thwart Score chosen in 310, for the desired Levenshtein distance.

At 314, the computing device performs unsupervised learning on the initial dataset based on the Levenshtein distance threshold corresponding to the Thwart Score and the desired number of groupings of 312.

Figure 4:
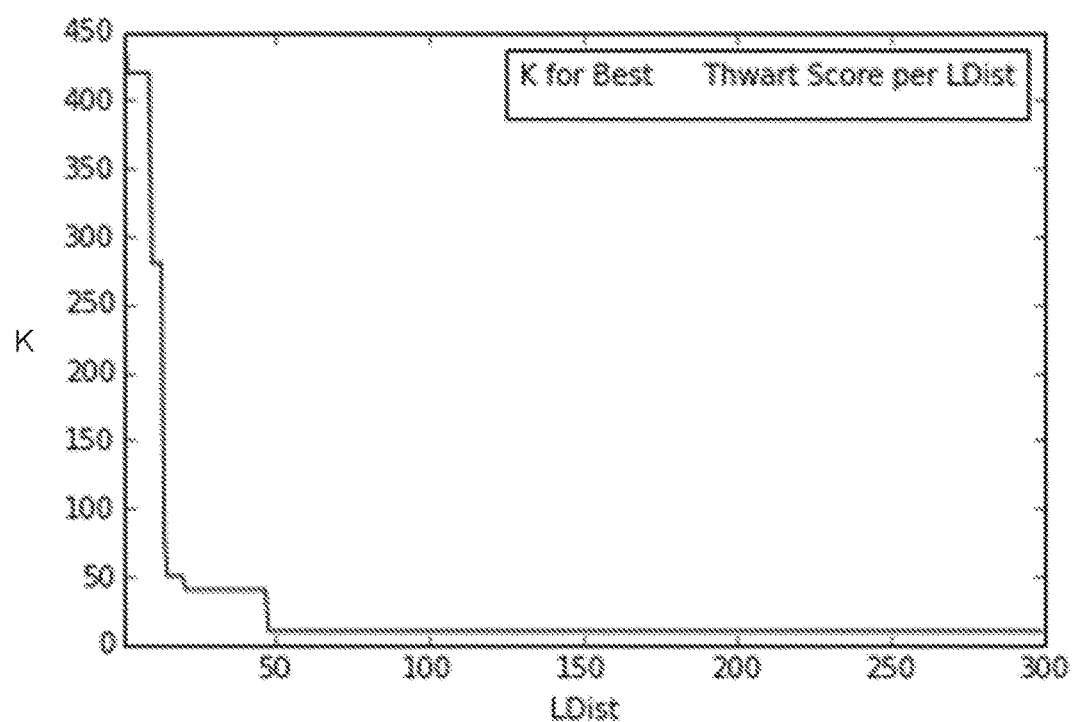
FIG. 4 illustrates a graph of cluster size vs Levenshtein distance threshold according to an embodiment of the disclosure.

FIG. 4 illustrates a graph of cluster size (or number of groupings) vs Levenshtein distance threshold (LDist), according to an embodiment of the disclosure. FIG. 4 is an example plot that can be generated from the process 300 in FIG. 3. That is, after 308, the computing device has a correspondence between Levenshtein distance thresholds and different numbers of groupings. The number of groupings with the best Thwart Score for each Levenshtein distance threshold can then be plotted to provide FIG. 4. Similarly, best Thwart Score for given number of groupings can be related to a specific Levenshtein distance threshold to provide FIG. 1.

FIG. 1 and FIG. 4 can be used by a system designer to determine appropriate parameters for performing unsupervised learning. In FIG. 1, a desired Levenshtein distance threshold can be used to obtain a best Thwart Score. The desired Levenshtein distance threshold can then be used to select a desired number of clusters K using FIG. 4. Once the desired K is chosen, the system designer knows beforehand how the unsupervised learning will perform.

Additionally, the system designer can choose the smallest size of K for the unsupervised learning algorithm. The larger the number K, the more comparisons are performed when the system is presented with an input string, and the higher the Thwart Score. The smaller the number K, the less comparisons are performed when the system is presented with an input string, and the lower the Thwart Score. With the tradeoff between performance and accuracy, embodiments of the disclosure provide efficacy measures that a system designer can use to predict a certain error that can be tolerated.

Figure 5:
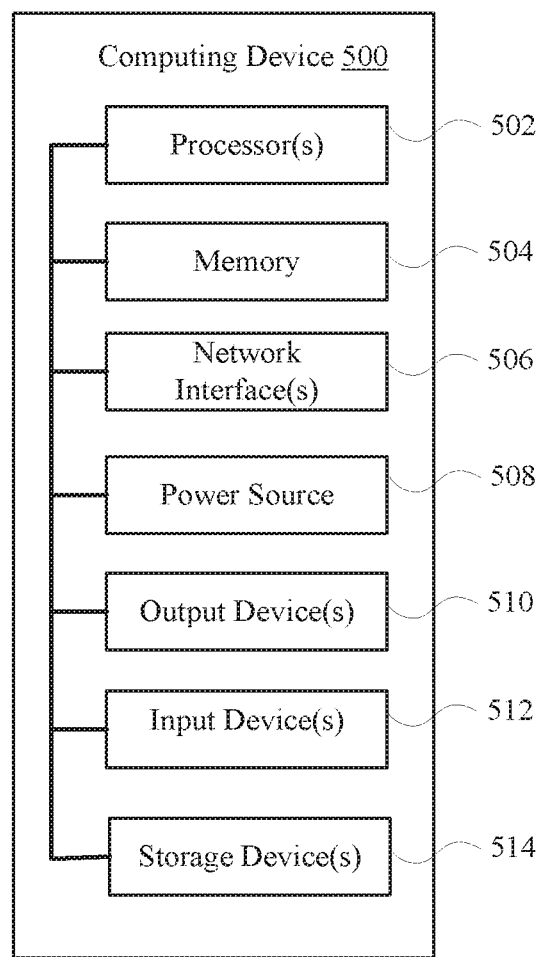
FIG. 5 illustrates components of a computing device according to some example embodiments.

FIG. 5 is a block diagram illustrating basic hardware components of a computing device 500, according to some example embodiments. The computing device 500 may include one or more processors 502, memory 504, network interfaces 506, power source 508, output devices 510, input devices 512, and storage devices 514. To simplify the discussion, the singular form will be used for all components identified in FIG. 5, when appropriate, but the use of the singular does not limit the discussion to only one of each component. For example, multiple processors may implement functionality attributed to processor 502.

Processor 502 is configured to implement functions and/or process instructions for execution within the computing device 500. For example, processor 502 executes instructions stored in memory 504 or instructions stored on a storage device 514. In certain embodiments, instructions stored on storage device 514 are transferred to memory 504 for execution at processor 502. Memory 504, which may be a non-transient, computer-readable storage medium, is configured to store information within the device 500 during operation. In some embodiments, memory 504 includes volatile memories such as RAM, dynamic random access memories (DRAM), and static random access memories (SRAM). Memory 504 also maintains program instructions for execution by the processor 502 and serves as a conduit for other storage devices (internal or external) coupled to the computing device 500 to gain access to processor 502.

Storage device 514 includes one or more non-transient computer-readable storage media configured for long-term storage of information. In some embodiments, the storage device 514 includes floppy discs, flash memories, magnetic hard discs, optical discs, solid state drives, or forms of electrically programmable memories (EPROM) or electrically erasable and programmable (EEPROM) memories.

Network interfaces 506 are used to communicate with external devices and/or servers. The computing device 500 may include multiple network interfaces 506 to facilitate communication via multiple types of networks. Network interfaces 506 may include network interface cards, such as Ethernet cards, optical transceivers, radio frequency transceivers, or any other type of device that can send and receive information. Examples of network interfaces 506 include radios compatible with several Wi-Fi standards, 3G, 4G, Long-Term Evolution (LTE), Bluetooth®, etc.

Power source 508 provides power to the computing device 500. Examples include rechargeable or non-rechargeable batteries utilizing nickel-cadmium or other suitable material. Power source 508 may include a regulator for regulating power from the power grid in the case of a device plugged into a wall outlet.

The computing device 500 may also be equipped with one or more output devices 510. Output device 510 is configured to provide output to a user using tactile, audio, and/or video information. Examples of output device 510 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 500.

The computing device 500 may also be equipped with one or more input devices 512. Input devices 512 are configured to receive input from a user or the environment where the computing device 500 resides. In certain instances, input devices 512 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

Figure 6:
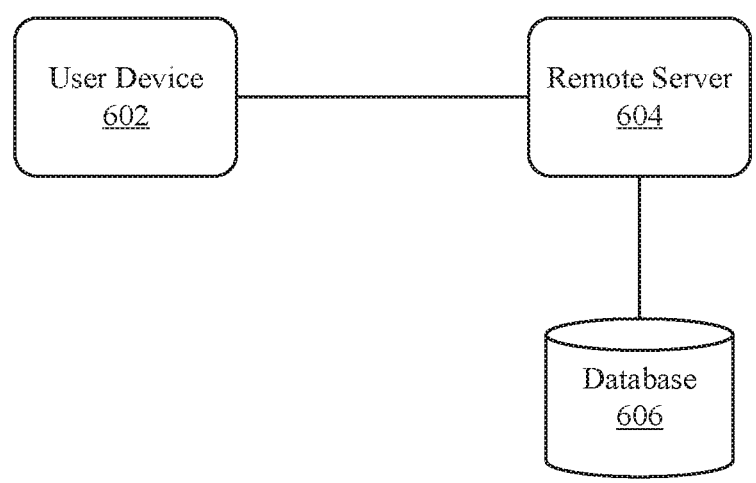
FIG. 6 illustrates a networked system according to an embodiment of the disclosure.

In an embodiment, FIG. 6 provides a system for authenticating a user. The system includes a user device 602, a remote server 604, and/or a database 606. The remote server 604 provides the user device 602 access to the database 606. Examples of the remote server 604 include one or more computing servers, desktop computers, and so on. Examples of the user device 602 include desktop computers, laptop computers, mobile phones, and so on.

Figure 7:
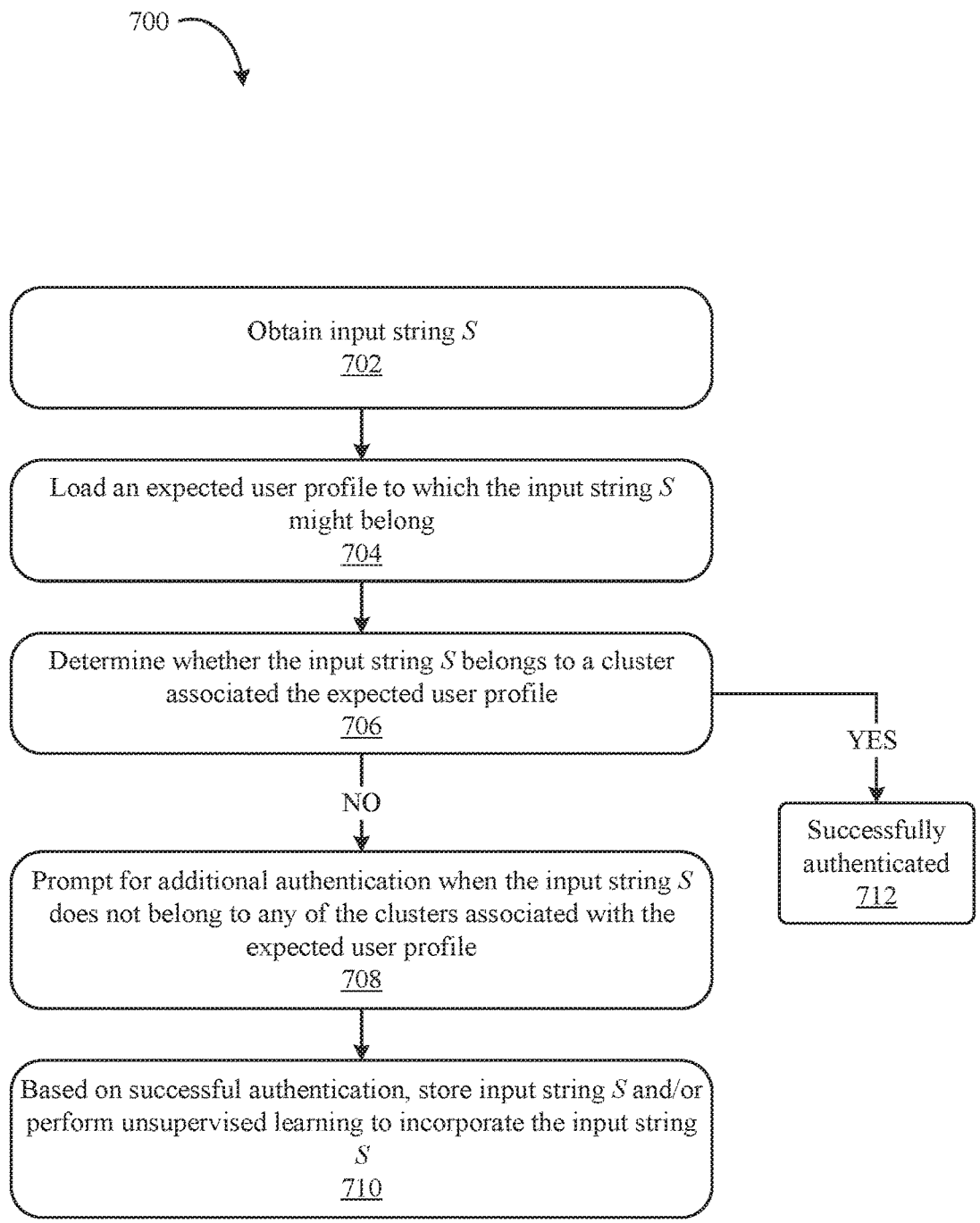
FIG. 7 illustrates a flow diagram for determining whether to authenticate a user, according to an embodiment of the disclosure.

In the system illustrated in FIG. 6, the remote server 604 manages user profiles. User profiles can include a user's name, a username, email, password, security questions, answers to the security questions, and tracking information. Tracking information may include user agents that a user has previously used to access the remote server 604, internet protocol (IP) address, and so on. User agents identify software that act on behalf of a user, and can be stored in the user's profile as a string. An example of a user agent is provided below:

Mozilla/5.0 (Windows NT 6.1; WOW64; Trident/7.0; SLCC2; .NET CLR 2.0.50727; .NET CLR 3.5.30729; .NET CLR 3.0.30729; Media Center PC 6.0; .NET4.0C; .NET4.0E; rv:11.0) like Gecko FIG. 7 illustrates a flow diagram of a process 700 performed by the remote server 604 for determining whether to authenticate a user on the user device 602. At 702, the remote server 604 obtains an input string S from the user device 602. In an embodiment, the input string S is a user agent obtained from the user device 602.

At 704, the remote server 604 loads a user profile that the input string S might belong. The user profile loaded can be based on properties provided by the user device 602, e.g., a user name or an identification of the user profile.

At 706, the remote server 604 determines whether the input string S belongs to one cluster associated with the user profile. The user profile can be associated with one or more clusters based on results of unsupervised learning on a large dataset of user information. The remote server 604 stores K clusters that represent user information from multiple users previously used in an unsupervised learning algorithm with parameters determined according to embodiments of the disclosure. The remote server 604 only focuses on data representations of a subset of the K clusters, i.e., only the clusters associated with the user profile. The remote server 604 determines whether the input string S matches data representation in one cluster of the subset of the K clusters.

If input string S matches data representation of one cluster associated with the user profile, then at 712, further authentication is not necessary and the user device 602 is deemed successfully authenticated by the remote server 604. On the other hand, if the input string S does not match data representation of any cluster associated with the user profile, then at 708, the remote server 604 prompts for additional authentication. At this point, the remote server 604 determines that the input string S is not contained within the user's profile, so the remote server 604 requires that the user device 602 authenticate.

At 710, based on a successful authentication, the remote server 604 stores the input string S and/or performs unsupervised learning including the input string S to update the cluster data representation of the user profile.

Embodiments of the disclosure can therefore be used in cyber security settings to enhance network security and data protection through user authentication. Embodiments of the disclosure can reduce storage requirements of a datacenter by storing cluster data representations instead of individual datasets, which can grow very large depending on number of users the datacenter caters to.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing quick searches of user information in a cyber security environment using efficacy measures for unsupervised learning, the method performed by a computer device comprising a processor and memory, the method comprising:
receiving an initial dataset including the user information;
calculating distance metrics between pairs of data in the initial dataset;
performing unsupervised learning on the initial dataset to obtain a plurality of total number of clusters, each total number of clusters covering the initial dataset;
determining efficacy measures for each total number of clusters using a plurality of distance metric thresholds;
determining a desired efficacy measure in the efficacy measures, the desired efficacy measure corresponding to a desired distance metric threshold in the plurality of distance metric thresholds;
determining a desired total number of clusters in the plurality of total number of clusters, the desired total number of clusters corresponding to the desired distance metric threshold;
performing unsupervised learning on the initial dataset using the desired total number of clusters to obtain a number of data representations of the user information; and
storing the data representations.

2. The method according to claim 1, wherein the user information comprises one or more of:
browser user agents, and internet protocol address.

3. The method according to claim 1, wherein the distance metrics calculated are Levenshtein distances between the pairs of data in the initial dataset.

4. The method according to claim 1, wherein each efficiency measure is a Thwart Score corresponding to each distance metric threshold, the Thwart Score being a harmonic mean between a corresponding Thwart Rate and a corresponding Recall.

5. The method according to claim 4, wherein each corresponding Recall is determined based on the calculated distance metrics and a corresponding distance metric threshold.

6. The method according to claim 4, wherein performing unsupervised learning on the initial dataset to obtain a plurality of total number of clusters comprises:
applying unsupervised learning to the initial dataset for a predetermined set of groupings, the predetermined set of groupings corresponding to the plurality of total number of clusters.

7. The method according to claim 1, further comprising:
receiving an input string;
determining whether the input string belongs to at least one of the data representations of the user information; and
prompting for additional authentication based on the input string not belonging to any of the data representations of the user information.

8. The method according to claim 7, wherein the input string is a browser user agent.

9. The method according to claim 7, further comprising:
receiving additional authenticating information; and
storing the input string based on successfully verifying the additional authenticating information.

10. The method according to claim 9, further comprising:
performing unsupervised learning with the input string and the user information to obtain new data representations of the input string and the user information.

11. A server for performing quick searches of user information in a cyber security environment using efficacy measures for unsupervised learning, the server comprising a processor and a non-transitory computer readable medium with instructions stored thereon such that when the processor executes the instructions, the server is configured to:
receive an initial dataset including the user information;
calculate distance metrics between pairs of data in the initial dataset;
perform unsupervised learning on the initial dataset to obtain a plurality of total number of clusters, each total number of clusters covering the initial dataset;
determine efficacy measures for each total number of clusters using a plurality of distance metric thresholds;
determine a desired efficacy measure in the efficacy measures, the desired efficacy measure corresponding to a desired distance metric threshold in the plurality of distance metric thresholds;
determine a desired total number of clusters in the plurality of total number of clusters, the desired total number of clusters corresponding to the desired distance metric threshold;
perform unsupervised learning on the initial dataset using the desired total number of clusters to obtain a number of data representations of the user information; and
store the data representations.

12. The server according to claim 11, wherein the user information comprises one or more of:
browser user agents, and internet protocol address.

13. The server according to claim 11, wherein the distance metrics calculated are Levenshtein distances between the pairs of data in the initial dataset.

14. The server according to claim 11, wherein each efficiency measure is a Thwart Score corresponding to each distance metric threshold, the Thwart Score being a harmonic mean between a corresponding Thwart Rate and a corresponding Recall.

15. The server according to claim 14, wherein each corresponding Recall is determined based on the calculated distance metrics and a corresponding distance metric threshold.

16. The server according to claim 14, further configured to:
apply unsupervised learning to the initial dataset for a predetermined set of groupings, the predetermined set of groupings corresponding to the plurality of total number of clusters.

17. The server according to claim 11, further configured to:
receive an input string;
determine whether the input string belongs to at least one of the data representations of the user information; and
prompt for additional authentication based on the input string not belonging to any of the data representations of the user information.

18. The server according to claim 17, further configured to:
receive additional authenticating information; and
store the input string based on successfully verifying the additional authenticating information.

19. The server according to claim 18, further configured to:

perform unsupervised learning with the input string and the user information to obtain new data representations of the input string and the user information.

20. A non-transitory computer readable medium for performing quick searches of user information in a cyber security environment using efficacy measures for unsupervised learning, the non-transitory computer readable medium including instructions stored thereon for performing:

receiving, by a server, an initial dataset including the user information;

calculating, by the server, distance metrics between pairs of data in the initial dataset;

performing, by the server, unsupervised learning on the initial dataset to obtain a plurality of total number of clusters, each total number of clusters covering the initial dataset;

determining, by the server, efficacy measures for each total number of clusters using a plurality of distance metric thresholds;

determining, by the server, a desired efficacy measure in the efficacy measures, the desired efficacy measure corresponding to a desired distance metric threshold in the plurality of distance metric thresholds;

determining, by the server, a desired total number of clusters in the plurality of total number of clusters, the desired total number of clusters corresponding to the desired distance metric threshold;

performing, by the server, unsupervised learning on the initial dataset using the desired total number of clusters to obtain a number of data representations of the user information; and storing, by the server, the data representations.

\* \* \* \* \*